(12) United States Patent
Stern

(10) Patent No.: US 6,585,136 B1
(45) Date of Patent: Jul. 1, 2003

(54) PASTE DISPENSER AND METHOD OF USE

(76) Inventor: Daniel A. Stern, 941 N. Norman Pl., Los Angeles, CA (US) 90049

( * ) Notice: Subject to any disclaimer, the term of this patent is extended or adjusted under 35 U.S.C. 154(b) by 130 days.

(21) Appl. No.: 09/957,796

(22) Filed: Sep. 21, 2001

(51) Int. Cl.[7] .................................................. G01F 11/42
(52) U.S. Cl. ........................................ 222/336; 222/345
(58) Field of Search ................................. 222/335, 336, 222/345, 361–364, 106, 494, 495

(56) References Cited

U.S. PATENT DOCUMENTS

| | | | | |
|---|---|---|---|---|
| 1,090,994 A | * | 3/1914 | Leach ............................. 48/46 |
| 1,178,401 A | * | 4/1916 | Lilly ........................... 222/364 |
| 1,710,233 A | * | 4/1929 | Mason et al. ................ 222/248 |
| 1,720,096 A | * | 7/1929 | Schofield .................... 222/363 |
| 2,050,756 A | * | 8/1936 | Kubo ........................... 222/324 |
| 2,063,288 A | * | 12/1936 | Allen, Jr. ..................... 141/360 |
| 2,539,283 A | * | 1/1951 | Strachan ..................... 222/354 |
| 2,837,252 A | * | 6/1958 | Hoynak, Jr. ................. 222/494 |

* cited by examiner

Primary Examiner—Ehud Gartenberg
Assistant Examiner—Melvin A. Cartagena
(74) Attorney, Agent, or Firm—Ted Masters

(57) ABSTRACT

A paste dispenser includes a housing which has two angularly spaced vanes which rotate about an axis. The two vanes and a contoured surface form a paste-receiving chamber. Paste is forced into the dispenser under pressure from a paste container such as a toothpaste tube. The paste fills the paste-receiving chamber, and continued pressure causes the contents of the paste-receiving chamber to be deposited at an opening where it can be claimed by a user.

11 Claims, 5 Drawing Sheets

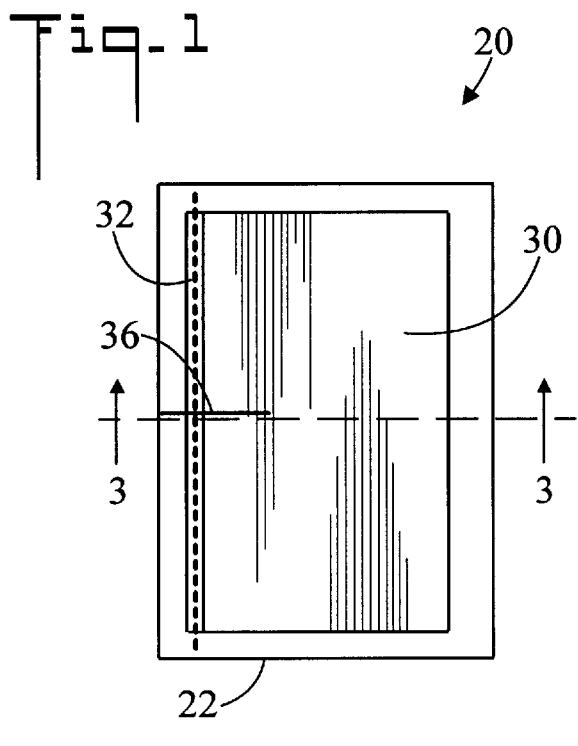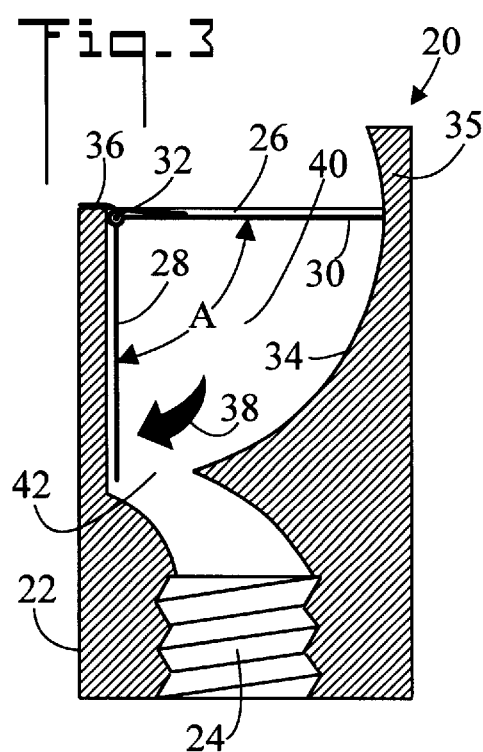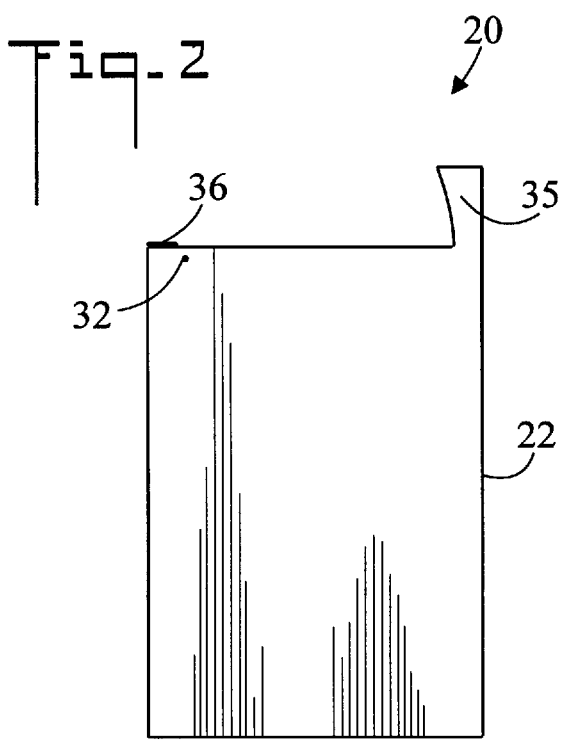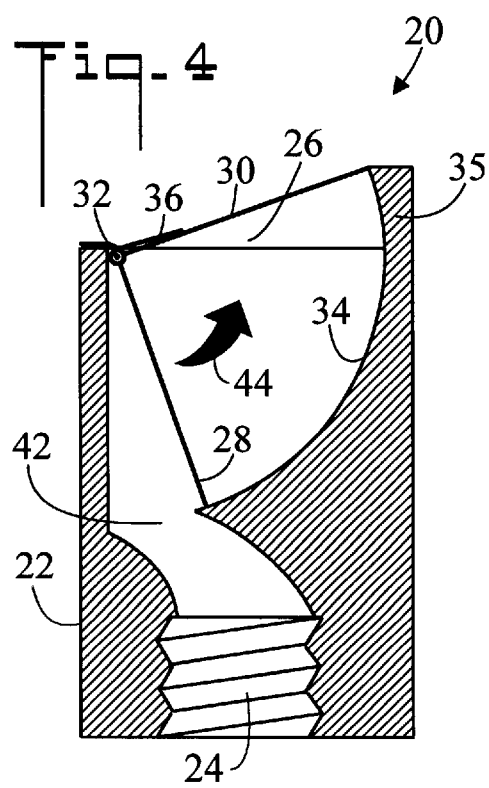

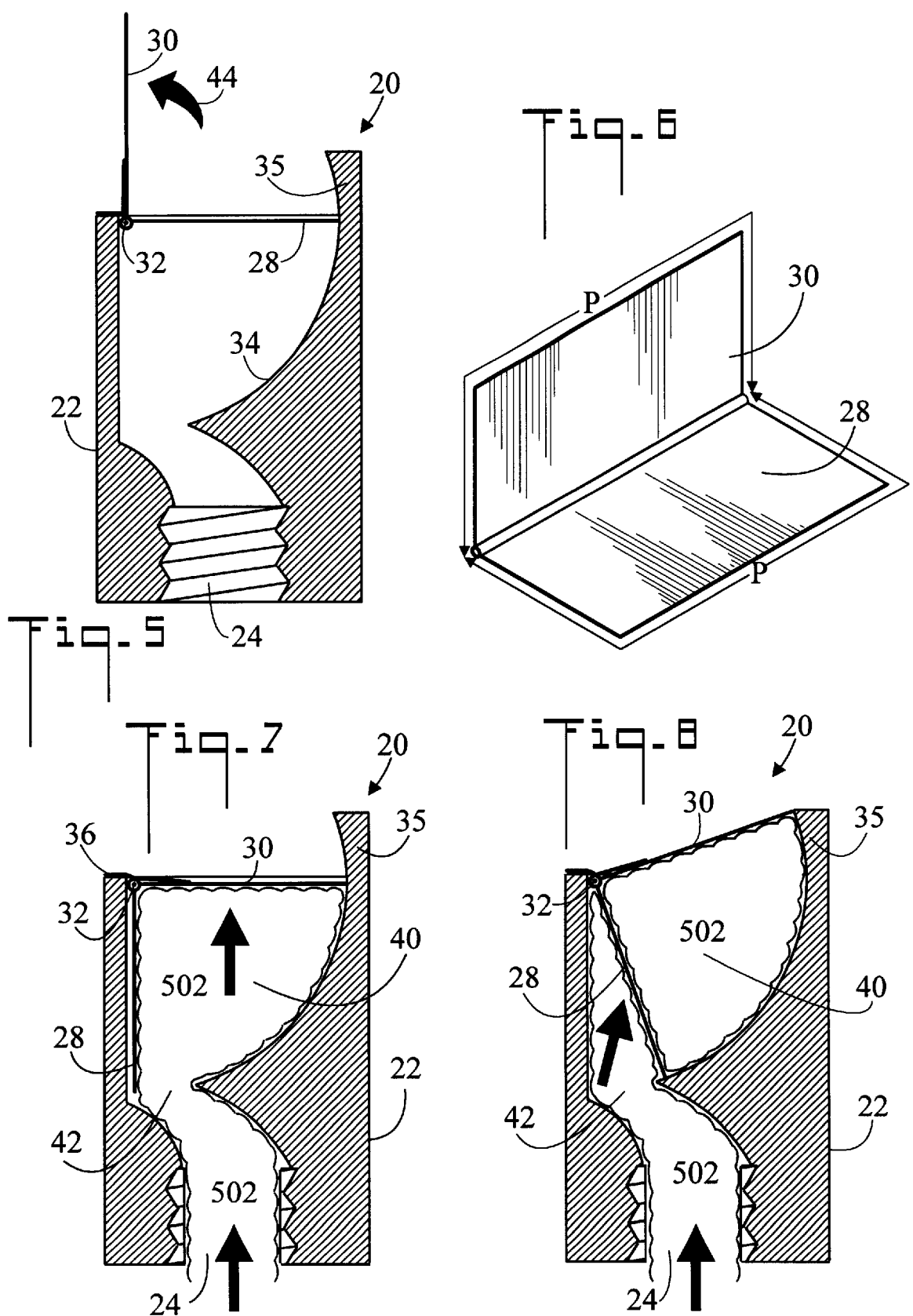

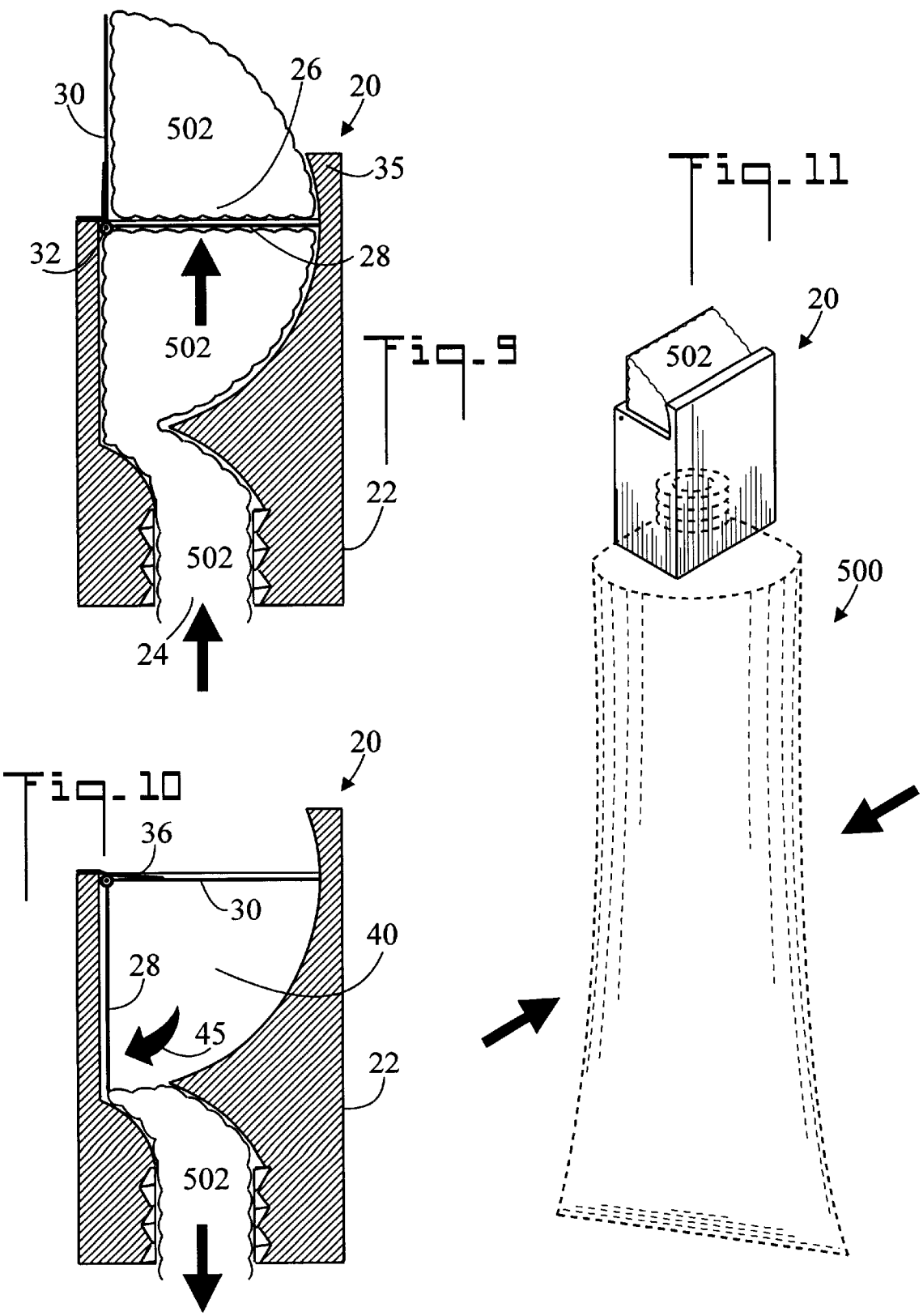

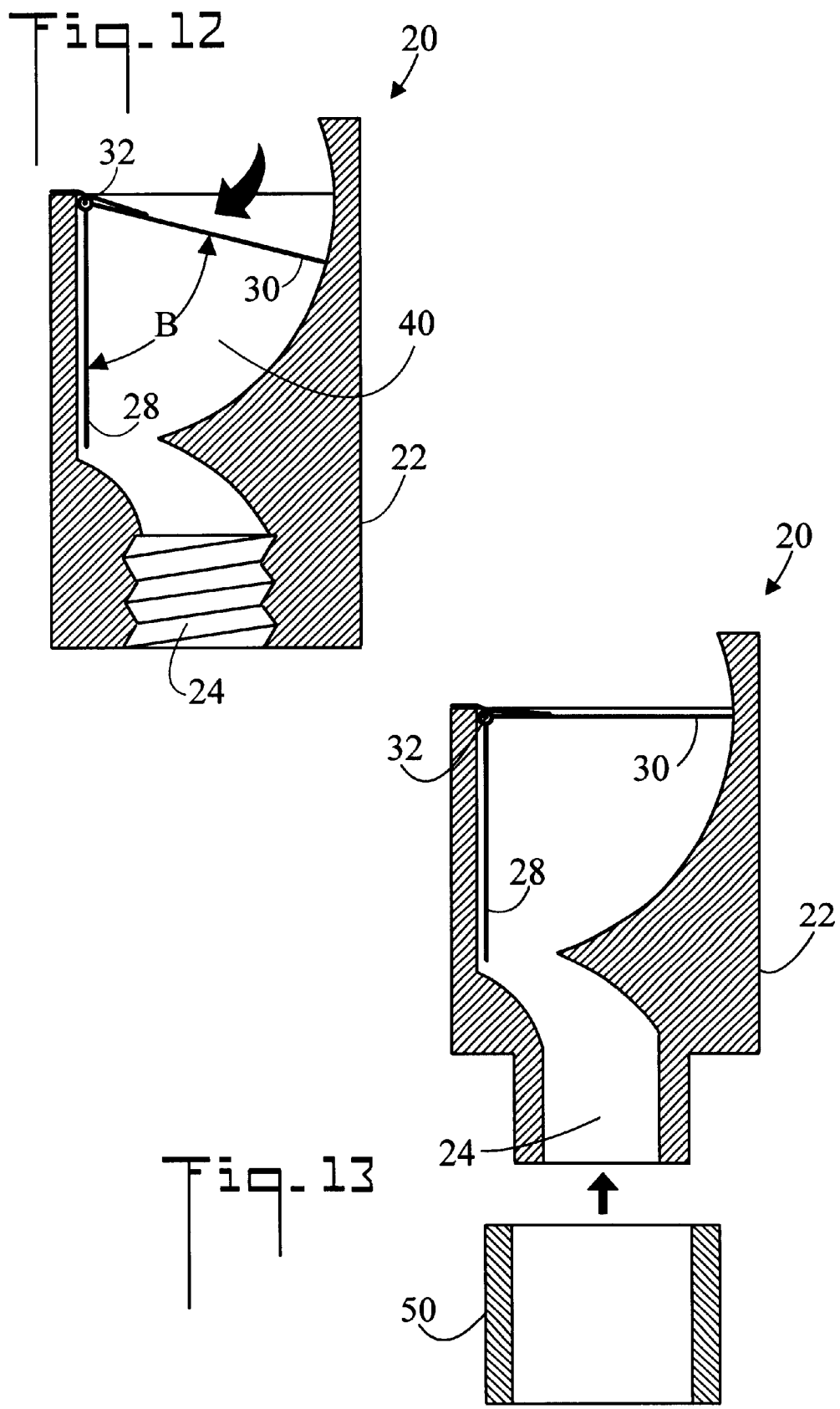

PASTE DISPENSER AND METHOD OF USE

TECHNICAL FIELD

The present invention pertains generally to paste containers such as those of the toothpaste variety, and more particularly to a dispenser which is attachable to the paste container, and which upon actuation delivers only a predetermined amount of paste to a user.

BACKGROUND OF THE INVENTION

Paste containers such as tubes of toothpaste, tubes of caulking, and the like are well known in the art. Typically, the paste container is squeezed to deliver the paste contents through an opening or mouth to a user. One problem with such devices, is that it is difficult to control the exact amount of paste product that is dispensed. Oftentimes too much paste is squeezed out of the tube and is therefore wasted.

SUMMARY OF THE INVENTION

The present invention is directed to a paste dispenser for dispensing paste from a paste container such as a tube of toothpaste. The present invention makes it possible to deliver a predetermined amount of paste each time the dispenser is utilized. The present invention overcomes the wasteful problem of squeezing too much paste from the tube.

In accordance with a preferred embodiment of the invention, a paste dispenser for dispensing paste from a paste container includes a walled housing having a paste ingress opening and a paste egress opening. A pair of angularly spaced vanes are rotatably connected to the housing about an axis. A contoured surface remains in proximate relationship with the perimeter of the vanes as the vanes are rotated about the axis. Biasing means such as a spring urge the vanes to an initial paste-receiving position. The surface, first vane, and the second vane comprise a paste-receiving chamber having a gap disposed toward the paste ingress opening. The first and second vanes are rotatable from the first paste-receiving position to a second paste-dispensing position.

The present invention permits adjustment of the amount of dispensed paste. In one embodiment the angle between the vanes may be changed by bending to change the size of the paste-receiving chamber. In another embodiment, different size dispensers may be provided which dispense different amounts of paste (e.g. small, medium, or large) In accordance with an important aspect of the invention, when the vanes are rotated about the axis, said first vane comes into proximate relationship with the surface before second vane leaves proximate relationship with the surface.

In accordance with an important feature of the invention, the dispenser threadably engages the paste container.

In accordance with another important aspect of the invention, a hollow rubber coupling can be used to connect the paste dispenser to the paste container.

In accordance with another important feature of the invention, the second vane is angularly adjustable with respect to the first vane.

In accordance with another preferred embodiment of the invention, the first vane is larger than the second vane. The first vane travels along a first contoured surface and the second vane travels along a second contoured surface. A lip exists between the two surfaces, so that as the first vane is rotated, it will be stopped by the lip.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a top plan view of a paste dispenser in accordance with the present invention;

FIG. 2 is a side elevation view of the paste dispenser;

FIG. 4 is a cross sectional view showing the vanes partially rotated;

FIG. 5 is a cross sectional view showing the vanes completely rotated;

FIG. 6 is a perspective view of the vanes;

FIG. 7 is a cross sectional view of paste being forced by pressure into the paste dispenser;

FIG. 8 is a cross sectional view showing the paste causing the vanes to rotate;

FIG. 9 is a cross sectional view of the vanes fully rotated thereby permitting access to a predetermined amount of paste;

FIG. 10 is a cross sectional view of the vanes rotated back to the original position by a biasing means;

FIG. 11 is a reduced perspective view of the paste dispenser installed on a paste container;

FIG. 12 is a cross sectional view of the angle between the vanes being adjusted;

FIG. 13 is a cross sectional view of a second embodiment;

DETAILED DESCRIPTION OF THE INVENTION

Figure 14:
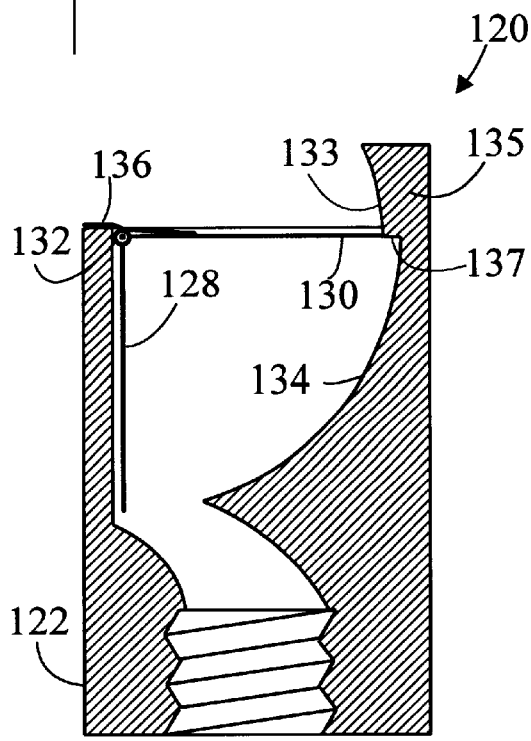
FIG. 14 is a cross sectional view of a third embodiment in the initial paste-receiving position; and, FIG. 15 is a cross sectional view of the third embodiment rotated to the paste-dispensing position.

Referring initially to FIGS. 1–3, there are illustrated top plan, side elevation, and cross sectional views respectively of a paste dispenser for dispensing paste from a paste container 500, generally designated as 20. Paste dispenser 20 includes a walled housing 22 having a paste ingress opening 24 and a paste egress opening 26. In a preferred embodiment, paste ingress opening 24 includes threads which are threadably engagable with the paste container 500 (refer also to FIG. 11). A first vane 28 is connected to and angularly spaced from a second vane 30. In a preferred embodiment of the invention, the angle A between the vanes is about 90°. Vanes 28 and 30 are rotatably connected about an axis 32 which is connected to housing 22 near paste egress opening 26. Each vane has a perimeter P (refer also to FIG. 6). In a preferred embodiment, first 28 and second 30 vanes are the same size and are substantially rectangular, however other shapes could also be employed that would produce different shaped batches of paste. For example, the shape could be circular or oval, or could be shaped to be attractive to children such as in a star pattern.

A contoured surface 34 is disposed within housing 22. Surface 34 is shaped so that as vanes 28 and 30 are rotated about axis 32, surface 34 remains in proximate relationship with at least a portion of perimeter P of at least one of the vanes. Or put another way, surface 34 is defined by the outermost portion of perimeter P of vanes 28 and 30 as the vanes are rotated about axis 32. Biasing means urge first vane 28 toward the wall of housing 22. In the shown embodiment, the biasing means includes a spring 36 which urges vanes 28 and 30 in direction 38.

Referring to FIG. 3, surface 34, first vane 28, and second vane 30 (along with two end walls of housing 22) comprising a paste-receiving chamber 40 having a gap 42 disposed toward paste ingress opening 24. The size of paste-receiving chamber 40 determines the amount of paste 502 which will be delivered from paste dispenser 20. First 28 and second 30 vanes are rotatable from a first paste-receiving position (shown in FIG. 3) to a second paste-dispensing position (shown in FIG. 5).

FIG. 4 is a cross sectional view showing vanes 28 and 30 partially rotated in direction 44. It is noted that as vanes 28 and 30 are rotated about axis 32 in direction 44, first vane 28 comes into proximate relationship with surface 34 before second vane 30 leaves proximate relationship with surface 34. This feature is made possible by the extended portion 35 of housing 22 and associated surface 34. Put another way, the arc of surface 34 must be greater than or equal to the arc subtended by the angle A between the vanes.

FIG. 5 is a cross sectional view showing vanes 28 and 30 completely rotated in direction 44. This is the paste-dispensing position where in a user may remove the predetermined amount (batch) of paste 502 from paste dispenser 20.

FIG. 6 is a perspective view of vanes 28 and 30 showing the perimeter P. In the shown embodiment, the outer portion of perimeter P defines surface 34. In the shown preferred embodiment vanes 28 and 30 are rectangular, however it may be readily appreciated that other shapes such as circular could also be employed.

FIG. 7 is a cross sectional view of paste 502 from paste container 500 being forced by pressure into paste dispenser 20. Paste 502 is shown with scalloped borders. Pressurized paste 502 from paste container 500 flows into paste ingress opening 24, passes through gap 42, fills paste receiving chamber 40, thereby exerting pressure upon second vane 30, thereby overcoming the force of biasing means 36 and causing vanes 28 and 30 to rotate about axis 32.

FIG. 8 is a cross sectional view showing the paste 502 causing vanes 28 and 30 to rotate about axis 32. In the shown position, first vane 28 blocks gap 42 and then the paste 502 flow exerts pressure upon first vane 28 thereby continuing the rotation of vanes 28 and 30.

FIG. 9 is a cross sectional view of vanes 28 and 30 fully rotated thereby permitting access to the predetermined amount of paste 502 which was contained within paste receiving chamber 40 (refer to FIG. 7). Paste 502 from paste receiving chamber 40 is deposited at paste egress opening 26, where it may be claimed by a user. For example, a user might use a toothbrush to remove paste 502 from dispenser 20.

FIG. 10 is a cross sectional view of vanes 28 and 30 rotated in direction 45 back to the original paste-receiving position of FIG. 3 by biasing means 36. The pressure from paste container 500 has been discontinued, so that vane 28 forces paste 502 out of paste receiving chamber 40.

FIG. 11 is a reduced perspective view of paste dispenser 20 installed on a paste container 500 such as a tube of toothpaste. It may be appreciated that other pastes such as caulking and the like could also be dispensed using the present invention.

FIG. 12 is a cross sectional view of the angle between vanes 28 and 30 being adjusted to a different angle B. Second vane 30 is angularly adjustable (such as by bending) with respect to first vane 28. By reducing the angle between the vanes, the size of paste-receiving chamber 40 is reduced, thereby reducing the amount of paste 502 that is delivered by paste dispenser 20.

FIG. 13 is a cross sectional view of a second embodiment of the invention. In this embodiment a hollow coupling 50 is connectable between paste ingress opening 24 and paste container 500. In a preferred embodiment coupling 50 is fabricated from rubber.

Figure 15:
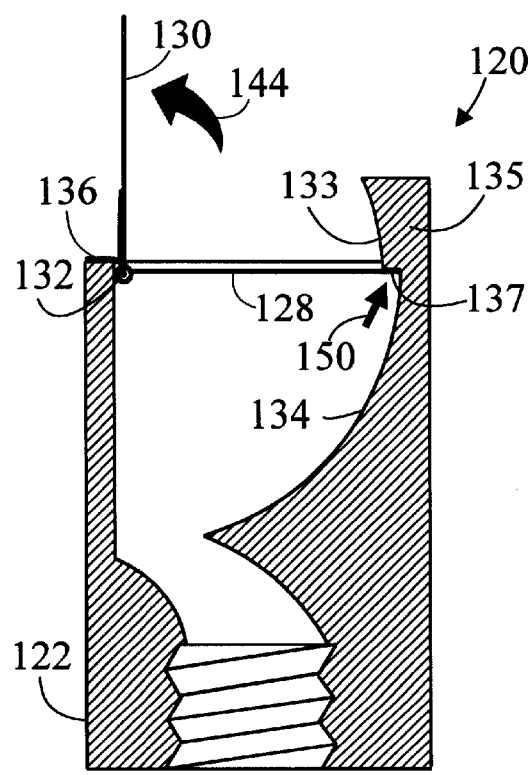

FIG. 14 is a cross sectional view of a third embodiment 120 in the initial paste-receiving position, and FIG. 15 is a cross sectional view of third embodiment 120 rotated to the paste-dispensing position. Paste dispenser 120 is similar to paste dispenser 20. However in paste dispenser 120, second vane 130 is shorter than first vane 128 and two contoured surfaces are employed. A first contoured surface 134 is disposed within housing 122. First surface 134 is shaped so that as first vane 128 is rotated about axis 132, first surface 134 remains in proximate relationship with the perimeter of first vane 128. A second contoured surface 133 is disposed on housing 122. Second surface 133 is shaped so that as second vane 130 is rotated about axis 132, second surface 133 remains in proximate relationship with the perimeter of second vane 130. Because of the different radiuses of the contoured surfaces, a lip 137 is disposed between first surface 134 and second surface 133. First 128 and second 130 vanes are rotatable in direction 144 from a first paste-receiving position (FIG. 14) to a second paste-dispensing position (FIG. 15), wherein first vane 128 comes into abutting contact (as at position 150) with lip 137 and is stopped thereby. In this fashion the rotation of vanes 128 and 130 is limited so that first vane 128 cannot rotate too far and lose contact with extended portion 135.

In terms of use, a method of dispensing paste, comprises:
(1) providing a paste container 500;
(2) providing a paste dispenser 20 including:
   a walled housing 22 having a paste ingress opening 24 and a paste egress opening 26;
   a first vane 28 is connected to and angularly spaced from a second vane 30, the vanes rotatably connected about an axis 32, the axis 32 connected to the housing 22 at the paste egress opening 26, each vane having a perimeter P;
   a contoured surface 34 is disposed within housing 22, the surface 34 shaped so that as the vanes are rotated about the axis 32, the surface 34 remains in proximate relationship with the perimeter P of at least one vane;
   biasing means 36 for urging the first vane 28 toward the housing wall 30;
   the surface 34, the first vane 28, and the second vane 30 comprising a paste-receiving chamber 40 having a gap 42 disposed toward the paste ingress opening 24; and,
(3) attaching the paste container 500 to the paste ingress opening 24 of the paste dispenser 20;
(4) causing paste 502 to be released from the paste container 500 under pressure, such as by squeezing;
(5) observing that paste 502 from the paste container 500 flows into the paste ingress opening 24, passes through the gap 42, fills the paste receiving chamber 40, thereby exerting pressure upon the second vane 30, thereby causing the vanes to rotate about the axis 32 until the first vane 28 blocks the gap 42 and the flow then exerts pressure upon the first vane 28 thereby continuing the rotation, finally causing the paste 502 from the paste receiving chamber 40 to be deposited at the paste egress opening 26;

(6) removing the deposited paste 502 from the paste egress opening 26 while the second vane 30 is in proximate relationship with the surface 34;

(7) discontinuing the release of paste 502 from the paste container 500; and, (8) observing that the first vane 28 is urged toward the housing wall 22.

In a preferred embodiment, prior to step (4), adjusting the angular spacing of the second vane 30 with respect to the first vane 28.

It is noted that in step (5) second vane 30 must always remains in proximate relationship with 34 surface. If too much pressure is applied, and second vane 30 breaks contact with surface 34, then more than the desired predetermined amount of paste 502 will be dispensed.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A paste dispenser for dispensing paste from a paste container, said paste dispenser comprising:

a walled housing having a paste ingress opening and a paste egress opening;

a first vane connected to and angularly spaced from a second vane, said vanes rotatably connected about an axis, said axis connected to said housing near said paste egress opening, each said vane having a perimeter;

a contoured surface disposed within said housing, said surface shaped so that as said vanes are rotated about said axis, said surface remains in proximate relationship with said perimeter of at least one said vane;

biasing means for urging said first vane toward said housing wall;

said surface, said first vane, and said second vane defining boundaries of a paste-receiving chamber having a gap disposed toward said paste ingress opening; and, so that pressurized paste from the paste container may flow into said paste ingress opening, pass through said gap, fill said paste-receiving chamber, thereby exerting pressure upon said second vane, thereby causing said vanes to rotate about said axis until said first vane blocks said gap and said flow then exerts pressure upon said first vane thereby continuing said rotation, finally causing the paste from said paste-receiving chamber to be deposited at said paste egress opening.

2. A paste dispenser according to claim 1, further including:

when said vanes are rotated about said axis, said first vane coming into proximate relationship with said surface before said second vane leaves proximate relationship with said surface.

3. A paste dispenser according to claim 1, further including:

said paste ingress opening threadably engagable with the paste container.

4. A paste dispenser according to claim 1, further including:

a hollow coupling connectable between said paste ingress opening and the paste container.

5. A paste dispenser according to claim 4, further including:

said hollow coupling fabricated from rubber.

6. A paste dispenser according to claim 1, further including;

said second vane angularly adjustable with respect to said first vane.

7. A paste dispenser according to claim 1, further including:

said first and second vanes being substantially rectangular.

8. A method of dispensing paste, comprising:

(1) providing a paste container;

(2) providing a paste dispenser including:

a walled housing having a paste ingress opening and a paste egress opening;

a first vane connected to and angularly spaced from a second vane, said vanes rotatably connected about an axis, said axis connected to said housing at said paste egress opening, each said vane having a perimeter;

a contoured surface disposed within said housing, said surface shaped so that as said vanes are rotated about said axis, said surface remains in proximate relationship with said perimeter of at least one said vane;

biasing means for urging said first vane toward said housing wall;

said surface, said first vane, and said second vane defining boundaries of a paste-receiving chamber having a gap disposed toward said paste ingress opening;

(3) attaching the paste container to said paste ingress opening of said paste dispenser;

(4) causing paste to be released from the paste container under pressure;

(5) observing that paste from the paste container flows into said paste ingress opening, passes through said gap, fills said paste-receiving chamber, thereby exerting pressure upon said second vane, thereby causing said vanes to rotate about said axis until said first vane blocks said gap and said flow then exerts pressure upon said first vane thereby continuing said rotation, finally causing the paste from said paste-receiving chamber to be deposited at said paste egress opening;

(6) removing the deposited paste from said paste egress opening;

(7) discontinuing the release of paste from the paste container; and, (8) observing that said first vane is urged toward said housing wall.

9. The method according to claim 8, further including:

In step (5), ensuring that said second vane always remains in proximate relationship with said surface.

10. The method according to claim 8, further including:

prior to step (4), adjusting the angular spacing of said second vane with respect to said first vane.

11. A paste dispenser for dispensing paste from a paste container, said paste dispenser comprising:

a walled housing having a paste ingress opening and a paste egress opening;

a first vane connected to and angularly spaced from a second vane, said vanes rotatably connected about an axis, said axis connected to said housing near said paste egress opening, each said vane having a perimeter, and said second vane shorter than said first vane;

a first contoured surface disposed within said housing, said first surface shaped so that as said first vane is rotated about said axis, said first surface remains in proximate relationship with said perimeter of said first vane;

a second contoured surface disposed on said housing, said second surface shaped so that as said second vane is rotated about said axis, said second surface remains in proximate relationship with said perimeter of said second vane;

a lip disposed between said first and second surfaces;

biasing means for urging said first vane toward said housing wall;

said first surface, said first vane, and said second vane defining boundaries of a paste-receiving chamber having a gap disposed toward said paste ingress opening; and, said first and second vanes rotatable from a first paste-receiving position to a second paste-dispensing position wherein said first vane comes into abutting contact with said lip and is stopped thereby.

* * * * *